United States Patent [19]
Baumgardner et al.

[11] 3,773,406
[45] Nov. 20, 1973

[54] REARVIEW PERISCOPE FOR VEHICLES
[75] Inventors: John D. Baumgardner; Wayne Vandenbrink; Jerry A. Yonker, all of Holland, Mich.
[73] Assignee: Donnelly Mirrors Inc., Holland, Mich.
[22] Filed: July 30, 1971
[21] Appl. No.: 167,599

[52] U.S. Cl. ................. 350/302, 350/299, 350/283, 219/543
[51] Int. Cl. ........................................... G02b 5/08
[58] Field of Search .................... 350/288, 302, 301, 350/307, 294, 283; 219/203, 522, 547, 543

[56] References Cited
UNITED STATES PATENTS

| | | | |
|---|---|---|---|
| 3,058,395 | 10/1962 | Mattsson | 350/302 |
| 3,463,578 | 8/1969 | Smith | 350/302 |
| 3,379,859 | 4/1968 | Marriott | 219/543 X |
| 2,525,012 | 10/1950 | Armstrong | 350/283 |
| 3,427,095 | 2/1969 | Dykema et al. | 350/288 |

FOREIGN PATENTS OR APPLICATIONS

| | | | |
|---|---|---|---|
| 1,132,384 | 10/1968 | Great Britain | 350/288 |

*Primary Examiner*—David Schonberg
*Assistant Examiner*—Michael J. Tokar
*Attorney*—Price, Heneveld, Huizenga & Cooper

[57] ABSTRACT

An improved rear view periscope system for vehicles including three mirrors, at least one of which is mounted within the vehicle. The improvements comprise an electrically conductive coating, deposited on or within a transparent cover means mounted between the interior and exterior of the vehicle, to heat the cover means to prevent fogging; safety breakaway means to allow the rotation or separation of the second mirror on or from its supporting brackets upon impact; a shield to prevent the reflection of overhead light rays by the first mirror without first having been reflected by the other mirrors and to limit the driver's field of vision to exclude portions of the mirror supports; and a day/night conversion filter to reduce the intensity of the light reflected through the periscope system.

22 Claims, 4 Drawing Figures

REARVIEW PERISCOPE FOR VEHICLES

This invention relates to periscope systems for vehicles, and more particularly, to rearview periscope systems incorporating improvements which increase the facility and safety of the use of such systems.

BACKGROUND OF THE INVENTION

Rearview periscope systems for vehicles are very well known. Such systems have been used to increase a vehicle driver's field of vision to the rear of the vehicle. Typically, these prior systems included three mirrors arranged to reflect rays of light from the rear of the vehicle to the eye of the driver. However, the prior systems were characterized by many disadvantages. For example, many of the previous systems had mirrors mounted in box-like structures which protruded through the roof of the vehicle to an area near the driver's head where he could conveniently look through the system. If the vehicle incorporating such a system were ever involved in an accident, the driver's head would strike the lower portion of the box-like structure with substantial possibility of sustaining serious injury. Similarly, if the prior periscope systems were used at night, the headlights from the vehicles to the rear of the periscope would shine directly into the periscope system thereby either temporarily blinding the driver of the vehicle or making the periscope system ineffective because of the bright lights filling the field of vision, especially since the periscopes included such a wide field of vision. Additionally, under certain conditions of the sun, prior devices have experienced intense reflection of the sun rays which were very annoying to the driver and detrimental to safety. Finally, the prior periscope systems could not be used effectively under all weather conditions because of the build-up of snow, ice, fog or rain droplets which would make the periscope system very ineffective and unsafe.

Therefore, the need was apparent for a periscope system which would increase the vehicle driver's field of vision to the rear of the vehicle and yet would be capable of being used in all types of weather conditions, for either day or night driving, and which would not cause serious injury to the driver of the vehicle should the vehicle become involved in an accident. Accordingly, it is an object of the present invention to provide a rearview periscope system which may be used in all types of weather conditions. Similarly, it is another object of the present invention to provide a rearview periscope system which may be used for either day or night driving. It is yet another object of the present invention to provide a rearview periscope system having structure on the interior of the vehicle which will give way upon impact. It is still another object of the present invention to provide a rearview periscope system which blocks the direct rays of the sun or street lights from being directly reflected into the driver's eye without first being reflected through the entire periscope system.

SUMMARY OF THE INVENTION

The novel objects and features of the present invention may be accomplished by providing an improved rearview periscope system described as follows. The rearview periscope system basically comprises three mirrors, one of which is mounted externally of the vehicle such that rays of light running generally horizontally to the roof of the vehicle from the rear of the vehicle may be reflected by the successive mirrors to the eye of the driver of the vehicle. The rays of light from the rear of the vehicle first strike the surface of third mirror, mounted at an angle with the horizontal externally of the vehicle, and are reflected generally vertically downwardly through a transparent cover means mounted on the roof of the vehicle between the interior and exterior of the vehicle. The transparent cover means is coated with, or includes therebetween a thin electrically conductive coating or layer which permits the conduction of electricity therethrough to heat the cover means in order to prevent the build-up of fog, snow and ice on the cover means.

After the reflected light rays have passed through the transparent cover means they will strike the surface of the second mirror which is detachably mounted at an angle on support brackets mounted on the roof of the vehicle. The second mirror and its supporting brackets therefore incorporate breakaway means comprising plurality of studs mounted on the casing of the second mirror which correspond to a plurality of spring clips mounted on the support means for the second mirror. Therefore, if the second mirror receives an impact, i.e., from the head or body of the driver of the vehicle during an accident, the second mirror will rotate or separate from the support means thereby preventing serious injury. When the second mirror is in place, it will reflect the reflected light rays generally downwardly at an angle to the surface of a first mirror which then reflects the light rays to the eye of the driver of the vehicle. As more fully described in co-pending U.S. Pat. application Ser. No. 167,730, filed on even date herewith and now abandoned (John F. Donnelly) entitled REARVIEW PERISCOPE ADJUSTMENT MEANS FOR VEHICLES, the first mirror is mounted on supporting and adjustment means which allow it to be adjusted to accommodate short or tall drivers while at all times keeping the field of vision to the rear the same for all size drivers.

The support brackets for the second mirror also include means to filter the light rays reflected through the periscope system and more particularly, the light rays reflected between the second and first mirrors. The filter means comprises a sheet of transparent material tinted to a color or neutral density suitable for reducing the intensity of the reflected light rays. The filter is rotatably mounted on the second mirror support means such that it may be rotated into and out of the path of travel of all possible light rays being reflected between the second and first mirrors. Thus, for night driving, the filter may be flipped or rotated downwardly into the path of the reflected light rays thereby reducing the intensity of those light rays including light rays from headlights of vehicles to the rear.

Additionally, the present invention also incorporates a shield mounted on the vehicle adjacent to the transparent cover means at an angle to the planes of the cover means and the first, second and third mirrors such that the shield prevents the reflection by the first mirror of light rays entering through the cover means without being first reflected by the second and third mirrors. That is, direct rays of the sun or overhead street-lights which could otherwise enter through the transparent cover means and strike the first mirror, and thereby be reflected into the eyes of the driver of the vehicle without being reflected first by the third and second mirrors, are prevented from doing so by this shield. The same shield also prevents the field of vision of the driver of the vehicle, as seen on the first mirror, from including the support means for the top of the second and third mirror the entire mirror and cover means. Finally, the mirror incorporates a specially built mirror which will prevent any rain droplets on the outside mirror from obscuring the rear vision of the driver.

These and other objects, advantages and features of the present novel invention will become apparent from a study of the following description taken in conjunction with the drawings.

DESCRIPTION OF THE PREFERRED EMBODIMENT

Figure 1:
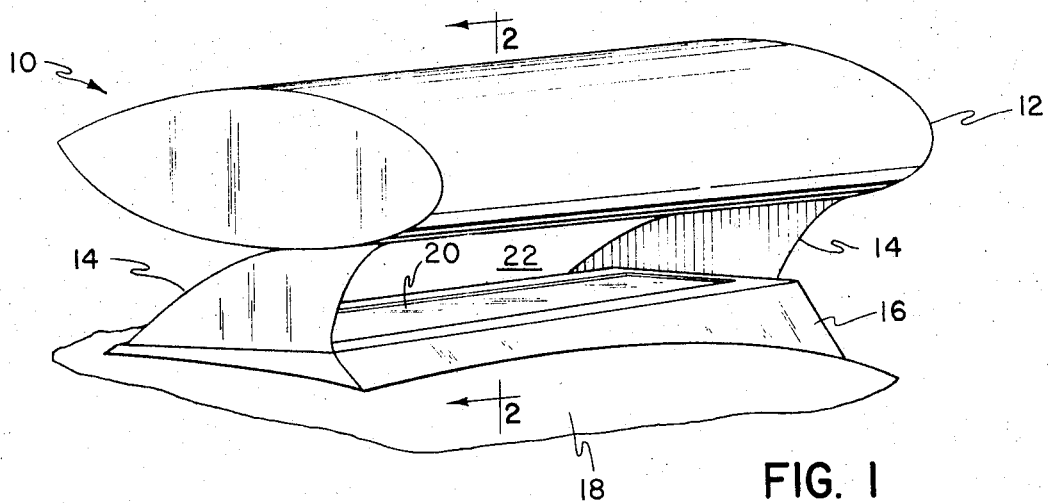
FIG. 1 is a perspective view of the external structure of the rearview periscope system mounted over the steering wheel of the vehicle on the roof of a vehicle.

Referring now more particularly to the drawings, FIG. 1 shows an external view of the rearview periscope system 10. The rearview periscope system 10 comprises an aerodynamically designed cowling 12 which takes the shape of a partial air foil and supports the third mirror (see FIG. 2). The cowling 12 is mounted on, and supported by, struts 14 which space the cowling 12 from the support means or frame 16 for the transparent cover means 20. The frame 16 is in turn supported and attached to the roof of the vehicle 18 generally over the area of the steering wheel and where the driver of the vehicle normally sits. The bottom of the cowling 12, the struts 14, and the frame 16 define a passageway 22 which effectively funnels a stream of air therethrough. The stream of air passing through passageway 22 is of sufficient force and volume to remove snow or other loose particles which have come to rest on transparent cover means 20. Since the force of the air passing through passageway 22 is not sufficient by itself to remove all snow, ice, or fog from the transparent cover means 20, an additional de-icing means is incorporated with the transparent cover means in the form of a thin electrically conductive coating or layer 60 (see FIG. 4), which electrically conductive coating will be more particularly described below.

Figure 2:
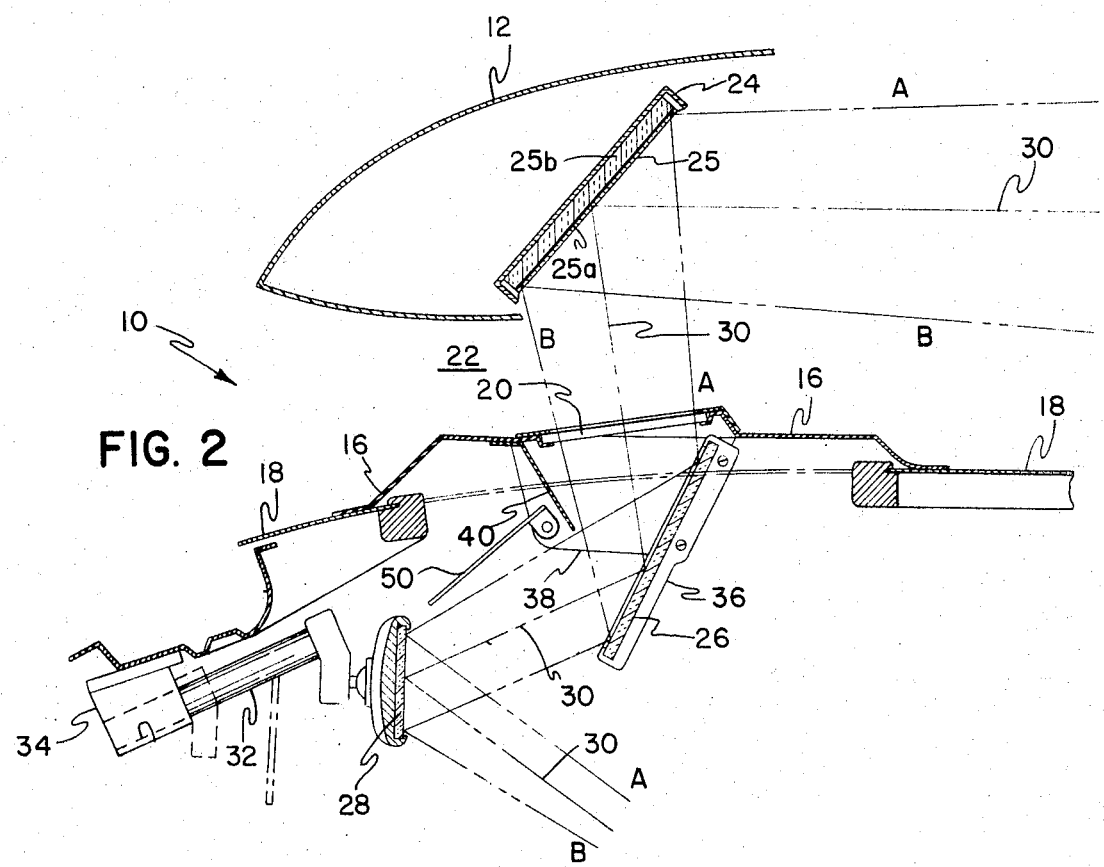
FIG. 2 is a cross-sectional view of the entire rearview periscope system taken along line II—II of FIG. 1.

In reference to FIG. 2, the entire relative arrangement of the rearview periscope system 10 may be seen. The rearview periscope system 10 basically comprises three mirrors 24, 26 and 28, which are arranged to reflect the light rays from the rear of the vehicle in a generally converging manner to the eye of the driver of the vehicle. More particularly, the third mirror 24 is mounted at an angle within cowling 12 in order to reflect the light rays entering from the rear of the vehicle in a generally horizontal manner generally vertically downwardly through the transparent cover means 20 to the surface of the second mirror 26. The second mirror 26 is mounted at an angle with both the third mirror 24 and the transparent cover means 20 and reflects the light rays coming from the third mirror 24 generally downwardly to the surface of first mirror 28. The first mirror 28 in turn reflects the twice reflected light rays to the eye of the driver of the vehicle (not shown). The boundaries of the field of vision, as seen by the driver of the vehicle utilizing the rearview periscope system 10, are defined by the light rays A and B in FIG. 2. As the light rays travel through the system, they converge slightly with each successive reflection since each successive mirror is slightly smaller than the one before and since each mirror is mounted at an angle with respect to the other two. By utilizing the successively sized and arranged mirrors, it is possible to provide a field of vision for the driver which includes a much larger percentage of the traffic system to his rear as compared with what may be seen with the well known conventional rearview mirrors.

Similarly, as more fully described in the aforementioned co-pending U.S. application Ser. No. 167,730, this unique arrangement of mirrors allows the accommodation of all sizes of drivers through the adjustment of the first mirror. As shown in FIG. 2, first mirror 28 is adapted to be adjusted along the central sightline 30 by means of a sliding rod 32 mounted in a base 34 which in turn is mounted on a section of the roof. By means of a set screw or other securing means (not shown in FIG. 2) the rod 32 and thus the first mirror 28 may be moved towards and away from the second mirror along the focal axis 30. The field of vision in any of the adjusted positions is exactly the same since the first mirror is always in exact alignment with the central sightline 30.

The second mirror 26 is encased in casing 36, which mirror and casing are together detachably mounted to a second mirror supporting bracket or member 38. The second mirror supporting brackets or members 38 are in turn mounted adjacent the transparent cover means 20 on frame 16. Day/night conversion or flip filter 50 is also mounted on second mirror supporting brackets for members 38 such that the filter 50 may rotate into and out of the path of travel of the reflected light rays between mirrors one and two. Additionally, shield 40, which prevents the reflection by the first mirror of light rays entering through the cover means without first being reflected by the second and third mirrors, and which also prevents the field of vision of the driver, as seen on the first mirror, from including the support means for the top of the second mirror and the entire third mirror and cover means, is fixedly mounted on frame 16 and extends generally downwardly at an angle to block any undesired light rays.

Figure 3:
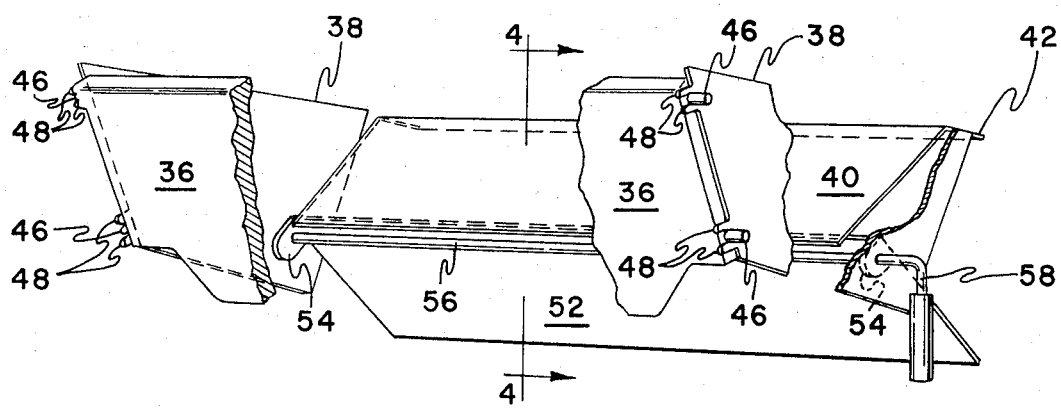
FIG. 3 is a perspective, fragmentary view of the second mirror and its supporting brackets and also showing the breakaway means, the flip filter and the field of vision limiting and first mirror reflection preventing shield.
Figure 4:
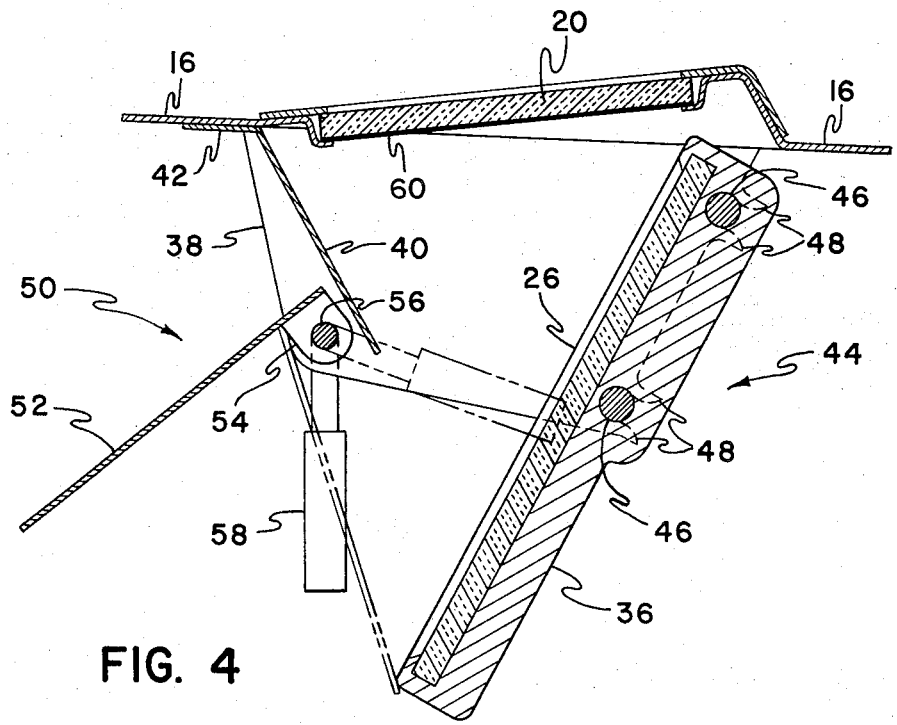
FIG. 4 is an enlarged, cross-sectional view, taken along line IV—IV of FIG. 3, showing the second mirror, the second mirror supporting bracket, and the transparent cover means in addition to the breakaway means, the flip filter and the field of vision limiting and first mirror reflection preventing shield.

Referring now in more detail to the improved features of the reaview periscope system 10, FIG. 2, 3 and 4 show in more detail several of the improved features incorporated in the system 10. As depicted in FIG. 2, the third or outside mirror 24 is a special construction to minimize and substantially eliminate any detrimental effect of rain droplets or other foreign matter remaining on the mirror. If ordinary mirrors are used very annoying and detrimental effects are produced. For example, if the mirror has a front face reflective surface, the repeated rubbing necessary to keep the surface clean would quickly deteriorate the mirrored or silvered first surface. If the glass substrate of the mirror is of normal thickness, and has a rear-face reflective surface, the rain droplets or other particulate matter settling on the glass surface will produce a double vision effect. Thus, when the driver looks through the periscope system he will see a drop both in its actual position on the glass surface and in its apparent position seen in the reflecting surface. In accordance with this invention, these two problems are solved by providing a very thin substrate 25 constructed of glass which is very tough and will not break easily. This glass, sold under the tradename Glaverbel, is between 1.0 and 1.2 millimeters in thickness and has a special chemical temper to reduce its susceptability to breakage and to minimize any handling problems because of its extreme thinness. This glass is commercially available from Glaverbel Societte Anonyme, Gilly, Belgium. However, such material, if not provided with a smooth backing, will deform. Thus, the substrate 25, which is coated on its back surface with a suitable reflective material 25a such as a coating of silver, is supported by a glass backing or layer 25b which inherently has a sooth surface providing the proper smooth backing surface support for the substrate 25. The backing layer 25b is substantially thicker than the thin substrate 25 in order to provide needed rigidity and support for the substrate. With the use of this construction the periscope system, and particularly the third mirror 24, may be used in any weather, including rain or snow, without any double vision problems occurring. This is because the substrate 25 is so thin that any particle resting on its surface is placed in close proximity to the reflecting layer or surface 25a, thereby preventing any additional reflection of the particle due to its being spaced substantially away from the reflecting surface.

As depicted in FIG. 3, the casing 36 for the generally rectangular second mirror is shown in its assembled position on second mirror supporting brackets 38. Pivotal or detachable mountings or breakaway means 44, which secure casing 36 to support brackets 38, comprise studs 46 formed integrally with casing 36 on either end thereof and pairs of spring clips 48. Studs 46 are received in a coresponding number of pairs of spring clips 48 formed integrally on the rearward edge of supporting brackets 38. Thus, the second mirror 26 and its casing 36 may be inserted and removed from its position on brackets 38 merely by snapping or unsnapping studs 46 into pairs of spring clips 48.

The safety feature of the breakaway means incorporated with the second mirror 26 will now be apparent. Any sizable impact on the lower half of the second mirror casing 36 will cause the combination mirror and casing to pivot from its normal operable position about the lower studs 46 and release the upper studs from the upper pairs of spring clips 48. Thus, should the driver of the vehicle be thrown violently forward against the lower section of the second mirror during an accident, the entire second mirror and casing will break away or rotate from the supporting brackets 38 thereby preventing the second mirror from causing any serious injury. As will be more easily seen in FIG. 2, the second mirror 26 and casing 36 are the lowermost protruding structures in the vicinity of the vehicle driver's head. Therefore, the removal of the second mirror and casing by means of the breakaway means upon sizable impact will remove the most likely cause of serious injuries. Similarly, the breakaway means 44 allow the second mirror to be easily removed to facilitate cleaning. It will also be apparent that the safety of the periscope system could be increased by covering the second mirror casing 36, and the other protruding portions of the system, with a suitable padding or energy absorbing layer to further reduce the possibility of injury.

Mounted to extend downwardly and at an angle between the supporting brackets 38 is a shield 40, as shown in FIGS. 3 and 4. Shield 40 is fixedly attached to frame 16 adjacent the transparent cover means 20 by means of the shield base 42. The shield 40 is preferably formed from sheet metal, but may be formed from any convenient opaque material. As will now be apparent, the shield 40 performs a dual function. Firstly, shield 40 blocks any light rays entering directly through cover means 20 which have not been reflected previously by the third mirror 24. In other words, any light ray passing through transparent cover means 20 from behind cowling 12 will be blocked by shield 40 before it strikes the surface of the first mirror 28, unless it has first been reflected by third mirror 24 and second mirror 26. Thus, any direct rays from the sun or overhead street lights which would otherwise directly reflect off the surface of first mirror 28 into the driver's eyes will now be effectively blocked by shield 40. Thus, the driver's field of vision, as seen on the surface of first mirror 28, will be restricted to those light rays bounded by light rays A and B as shown in FIG. 2.

Secondly, shield 40 prevents the field of vision of the driver of the vehicle from including substantial amounts of the support means or frames for the second and third mirrors and cover means. Therefore, the driver's field of vision will again be seen to be restricted to only the light rays within the boundaries set by light rays A and B, as shown in FIG. 2.

Also mounted on the supporting brackets 38 is the day/night conversion or flip filter 50 as shown in FIGS. 3 and 4. The flip filter 50 comprises a rectangular sheet of transparent material 52 of a neutral density or tinted to a color suitable for reducing the intensity of light rays being reflected through the periscope system 10. The transparent material 52 is fixedly attached to tabs 54 which in turn are mounted between brackets 38 on a cylindrical rod 56. The cylindrical rod 56 is in turn rotatably mounted between brackets 38. Rotation of the flip filter 50 is accomplished by means of a handle 58 extending at a right angle to rod 56 at one end thereof. When the periscope system is used during the day, the flip filter 50 will normally be kept in the unused position shown by the solid lines in FIGS. 2 and 4. However, when the periscope system is used at night, the flip filter 50 may be rotated by means of handle 58 into its operable position as shown by the phantom lines in FIG. 4. When in its operable position, flip filter 50 covers the entire path of travel of all possible light rays being reflected between the first and second mirrors and has its lower end in contact with the lower end of the second mirror casing 36. In the preferred embodiment tinted plexiglas is used for the transparent material 52. The plexiglas is tinted to a gray hue such that the intensity of the light being reflected through the periscope system 10 is reduced by approximately 25 percent. Thus, by utilizing the day/night conversion of flip filter 50, the rearview periscope system 10 complies with all the federal government regulations regarding rearview mirrors for use at night.

Mounted between the exterior and interior of the vehicle directly above the second mirror 26 and supporting brackets 38 is the transparent cover means 20. As described above, cover means 20 is supported by frame 16 directly under cowling 12 and third mirror 24 in the path of a substantial air flow through passageway 22. This air flow helps keep snow and ice from building up on cover means 20. However, since cover means 20 is exposed to a substantial temperature differential during the winter months, i.e., one surface is exposed to the outside and one surface is exposed to the inside, the possibility of fogging is substantial. To help prevent this fogging, a thin, electrically conductive coating or layer 60 is disposed either on the interior surface of transparent cover means 20 or between two laminates. The cover means 20 may be constructed in one piece or it may be a laminate with the electrically conductive coating or layer 60 disposed between the laminates along with a layer of plastic which fuses the laminates (not shown in the drawings). The laminate construction provides significantly greater strength for the cover means. For effective defogging, the electrically conductive coating 60 should have a power density of at least about one-half watt per square inch. In addition, so as not to obstruct visibility, the coating should be capable of transmitting light rays at least about at 70 percent of their original intensity, and preferably above about 80 percent. Finally, it is preferred that the coating 60 have a durability of at least about 100 and preferably greater than 200 standard eraser rubs before deterieration when used on an exposed surface. Any standard eraser rubs may be used such as that performed in accordance with the abrasion resistance test described in military specification MIL–C–675A of Jan. 6, 1964, entitled "Coating of Glass Optical Elements (Anti-reflection)." The eraser used for these abrasion-resistance tests was described in military specification MIL–E–12397 entitled "Eraser, Rubber Pumice for Testing Coated Optical Elements." These specifications are available from the United States Government Printing Office. When the coating or layer 60 is applied between the laminates of a laminated cover means, the durability characteristics become less significant. A variety of commercially available coatings having the above characteristics are suitable for use with cover means 20 according to the present invention. For example, several NESA (chemically deposited tin oxide coatings) and NESATRON (vacuum deposited indium oxide coatings) coatings available from the P. P. G. Industries of Pittsburgh, Pennsylvania, can be used with good results. Also several chemically and vacuum deposited tin oxide coatings known as E. C. films, which are available from Corning Glass Company of Corning, New York, are also suitable. By utilizing conventional electrical circuitry to connect the conductive coating or layer 60 to an electrical energy source, it is possible to heat the transparent cover means 20 by means of the coating 60 to thereby prevent the build-up of fog and ice.

In summary then, the rearview periscope system 10 includes five novel and improved features which facilitate the use and safety of the periscope system. These features include the shield 40 which is both of vision limiting and first mirror direct reflection preventing means; the breakaway means 44 which allow the second mirror 26 and casing 36 to separate or rotate from their support brackets 38 upon sizable impact to the lower portion of the casing 36; the day/night conversion or flip-filter 50 which may be rotated into and out of its operable position to reduce the intensity of the light rays being reflected through the system; a thin, electrically conductive coating 60 which has a sufficient resistivity to electricity to heat the surface of the cover means 20 to prevent the build-up of fog and ice; and a specially made outside or third mirror constructed of a thin, back surface reflective mirror mounted on a flat support, such as glass, such mirror minimizing any detrimental effects of rain drops or other particulate matter resting thereon.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A periscope system for vehicles comprising:
   first, second and third mirrors all located on a central sightline such that said third mirror reflects light rays from the exterior of said vehicle to said second mirror which in turn reflects said rays to said first mirror which in turn reflects said rays to the eye of the driver of the vehicle;
   transparent cover means interposed between the exterior and interior of said vehicle to allow the entry of light rays from said exterior;
   support means for said three mirrors and said cover means supporting said third mirror exterior of said vehicle; said third mirror being adjacent to and spaced from said cover means and defining an airflow passageway therewith; said passageway providing a flow of air therethrough when said vehicle is in motion, said flow of air preventing the build-up of foreign particles on said cover means; cover means including a layer of thin, electrically conductive coating for conducting electricity therethrough to heat said cover means and to cooperate with said flow of air to prevent a build-up of fog and ice on said cover means.

2. A periscope system for vehicles as described in claim 1 wherein said thin, electrically conductive coating has a visible transmission of light rays of greater than about 70 percent.

3. A periscope system for vehicles as described in claim 1 wherein said thin, electrically conductive coating has a power density of at least about one-half watt per square inch.

4. A periscope system for vehicles as described in claim 3 wherein said thin, electrically conductive coating has a power density of about from one-half to 1 watt per square inch.

5. A periscope system for vehicles as described in claim 3 wherein said thin, electrically conductive coating has a durability of at least 100 standard eraser rubs.

6. A periscope system for vehicles comprising:
   first, second and third mirrors mounted on said vehicle and all located on a central sightline, such that said third mirror reflects light rays from the exterior of said vehicle to said second mirror which in turn reflects said rays to said first mirror which in turn reflects said rays to the eye of the driver of the vehicle;

transparent cover means interposed between the exterior and interior of said vehicle to allow the entry of light rays from said exterior; and support means for said three mirrors and said cover means including breakaway means for said second mirror; said breakaway means including a plurality of studs mounted on said second mirror, said studs detachably engaging a corresponding plurality of rearwardly opening spring clips mounted on said support means for said second mirror; a portion of said second mirror projecting below the interior of the roof of said vehicle; said second mirror being pivotally retained by said engaging studs and spring clips and pivotal about at least two of said studs and spring clips whereby upon impact the second mirror will pivot out of the way without completely separating from said support means in the event a passenger is accidentally thrown against said second mirror.

7. A periscope system for vehicles comprising:

first, second and third mirrors all located on a central sightline such that said third mirror reflects light rays from the exterior of said vehicle to said second mirror which in turn reflects said rays to said first mirror which in turn reflects said rays to the eye of a driver of the vehicle;

transparent cover means interposed between the exterior and interior of said vehicle to allow the entry of light rays from said exterior;

support means for said three mirrors and said cover means; and means to limit the field of vision of said driver using said periscope system and to prevent the reflection by said first mirror of undesirable light rays entering through said cover means without being first reflected by said second and third mirrors; said means comprising a shield means mounted internally of said periscope system on said vehicle adjacent to said transparent cover means and at an angle to the planes of said cover means and said first, second and third mirrors for preventing the field of vision of said driver, as seen on said first mirror, from including substantial portions of the support means for said second and third mirrors and said cover means, as well as preventing the reflection of said undesirable light rays.

8. A periscope system for vehicles comprising:

first, second and third mirrors all located on a central sightline such that said third mirror reflects light rays from the exterior of said vehicle to said second mirror which in turn reflects said rays to said first mirror which in turn reflects said rays to the eye of the driver of the vehicle;

transparent cover means interposed between the exterior and interior of said vehicle to allow the entry of light rays from exterior;

support means for said three mirrors and said cover means; and means to filter the light rays reflected through said periscope system; and means for pivotally mounting said filter means for convenient rotation by a driver into and out of the line of travel of the light rays being reflected from said second mirror to said first mirror.

9. A periscope system for vehicles as described in claim 8 wherein said filter means is a sheet of transparent material tinted to a color suitable for reducing the intensity of said light rays.

10. A periscope system for vehicles as described in claim 9 wherein said filter means is rotatably mounted on said support means such that said filter means may be rotated into and out of the line of travel of all possible light rays being reflected between said first and second mirrors.

11. A periscope system for vehicles as described in claim 8 wherein said transparent material is a tinted plastic material.

12. A periscope system for vehicles comprising:

first, second and third mirrors all located on a central sightline such that said third mirror reflects light rays from the exterior of said vehicle to said second mirror which in turn reflects said rays to said first mirror which in turn reflects said rays to the eye of the driver of the vehicle;

transparent cover means interposed between the exterior and interior of said vehicle to allow the entry of light rays from said exterior;

support means for said three mirrors and said cover means, said third mirror comprising a laminated construction wherein a reflective layer is disposed between a thin substrate and a thicker backing layer; said laminated construction substantially eliminating optical distortion due to foreign matter on the surface thereof and increasing the breakage resistance of said third mirror.

13. A periscope system for vehicles as described in claim 12 wherein said substrate is about 1.0 to 1.2 millimeters in thickness.

14. A periscope system for vehicles as described in claim 13 wherein said substrate is chemically tempered.

15. A periscope system for vehicles comprising:

first, second and third mirrors all located on a central sightline, such that said third mirror reflects light rays from the exterior of said vehicle to said second mirror which in turn reflects said rays to said first mirror which in turn reflects said rays to the eye of the driver of the vehicle;

said third mirror comprising a laminated construction wherein a reflective layer is disposed between a thin substrate and a thicker backing layer;

transparent cover means interposed between the exterior and interior of said vehicle to allow the entry of light rays from said exterior;

support means for said three mirrors and said cover means including breakaway means for movement of said second mirror from its normal position with respect to said support means;

means to limit the field of vision of said driver using said periscope system and to prevent the reflection by sz first mirror of light rays entering through said cover means without being first reflected by said second and third mirrors; and means to filter the light rays selected through said periscope system.

16. A periscope system for vehicles as described in claim 15 wherein said breakaway means comprises a plurality of studs mounted on said second mirror, said studs detachably engaging a corresponding plurality of spring clips mounted on said support means for said second mirror such taht said second mirror will separate from said support means when said second mirror receives an impact.

17. A periscope system for vehicles as described in claim 15 wherein said field of vision limiting and first mirror reflection preventing means is a shield mounted on said vehicle adjacent to said transparent cover means and at an angle to the planes of said cover means and said first, second and third mirrors, such that the field of vision of said driver, as seen on said first mirror, includes substantially none of the support means for said second and third mirrors and said cover means.

18. A periscope system for vehicles as described in claim 15 wherein said filter means is a sheet of transparent material tinted to a color suitable for reducing the intensity of said light rays.

19. A periscope system for vehicles as described in claim 18 wherein said filter means is rotatably mounted on said support means such that said filter means may be rotated into and out of the line of travel of all possible light rays being reflected between any two of said mirrors.

20. A periscope system for vehicles as described in claim 19 wherein said filter means may be rotated into and out of the line of travel of the light rays being reflected from said second mirror to said first mirror.

21. A periscope system for vehicles as described in claim 15 wherein said substrate is about 1.0 to 1.2 millimeters in thickness.

22. A periscope system for vehicles comprising:
first, second and third mirrors all located on a central sightline such that said third mirror reflects light rays from the exterior of said vehicle to said second mirror which in turn reflects said rays to said first mirror which in turn reflects said rays to the eye of the driver of said vehicle;
said third mirror comprising a laminated construction wherein a reflective layer is disposed between a thin substrate and a thicker backing layer;
a transparent cover interposed between the exterior and interior of said vehicle to allow the entry of light rays from said exterior, said cover including a layer of a thin, electrically conductive coating deposited thereon, such that electricity may be conducted therethrough to heat said glass thereby preventing a build-up of fog and ice on said cover, said coating having a visible transmission of light rays of greater than about 70 percent, a power density of greater than about one-half watt per square inch and a durability of greater than about 100 standard eraser rubs before deterioration;
support means for said three mirrors and said cover including adjustment means for the adjustment of said first mirror with respect to said second mirror and breakaway means for movement of said second mirror from its normal position with respect to said support means, said breakaway means comprising a plurality of spring clips mounted on said second mirror, said clips detachably engaging a corresponding plurality of studs mounted on said support means for said second mirror such that said second mirror will separate from said support means when said second mirror receives an impact;
means to limit the field of vision of said driver using said periscope system and to prevent the reflection by said first mirror of light rays entering through said cover without being first reflected by said second and third mirrors, said field of vision limiting and first mirror reflection preventing means comprising a shield mounted on the roof of said vehicle adjacent to said transparent cover and first, second and third mirrors such that the field of vision of said driver, as seen on said first mirror, includes substantially none of the support means for said second and third mirrors and said cover; and
means to filter the light rays reflected through said periscope system comprising a sheet of transparent tinted plastic material rotatably mounted on said support means such that said plastic material sheet may be rotated into and out of the line of travel of all possible light rays being reflected from said second mirror to said first mirror whereby said light rays are reduced in intensity by said plastic material.

* * * * *

PO-1050
(5/69)

UNITED STATES PATENT OFFICE
CERTIFICATE OF CORRECTION

Patent No. 3,773,406                Dated November 20, 1973

Inventor(s) John D. Baumgardner, Wayne Vandenbrink, Jerry A. Yonker

It is certified that error appears in the above-identified patent and that said Letters Patent are hereby corrected as shown below:

Column 5, line 22;

Delete "sooth" and insert therefor --smooth--;

Column 10, line 58;

Delete "sz" and insert therefor --said--;

Column 10, line 68;

Delete "taht" and insert therefor --that--.

Signed and sealed this 9th day of April 1974.

(SEAL)
Attest:

EDWARD M. FLETCHER, JR.
Attesting Officer

C. MARSHALL DANN
Commissioner of Patents